(12) United States Patent
Roffe

(10) Patent No.: US 10,132,443 B2
(45) Date of Patent: Nov. 20, 2018

(54) SYSTEM FOR HANGING ARTISTS BRUSHES AND SIMILAR CYLINDRICAL IMPLEMENTS

(71) Applicant: Eva Roffe, Miami, FL (US)

(72) Inventor: Eva Roffe, Miami, FL (US)

( * ) Notice: Subject to any disclaimer, the term of this patent is extended or adjusted under 35 U.S.C. 154(b) by 93 days.

(21) Appl. No.: 14/023,419

(22) Filed: Sep. 10, 2013

(65) Prior Publication Data

US 2014/0068922 A1    Mar. 13, 2014

Related U.S. Application Data

(60) Provisional application No. 61/743,707, filed on Sep. 10, 2012.

(51) Int. Cl.
- *A46B 17/02*    (2006.01)
- *B44D 3/12*    (2006.01)
- *F16M 13/00*    (2006.01)

(52) U.S. Cl.
CPC ......... *F16M 13/005* (2013.01); *A46B 17/02* (2013.01); *B44D 3/123* (2013.01); *A46B 2200/205* (2013.01); *Y10T 29/49959* (2015.01)

(58) Field of Classification Search
CPC .. A46B 17/02; A46B 2200/205; B44D 3/123; B44D 3/12; A45F 5/00; Y10T 29/49947; Y10T 29/49959; Y10T 29/49961; F16M 13/005
USPC ........................................ 248/110, 111, 112
See application file for complete search history.

(56) References Cited

U.S. PATENT DOCUMENTS

| | | | | |
|---|---|---|---|---|
| 381,888 | A * | 4/1888 | Rice | A47G 25/28 223/88 |
| 664,217 | A * | 12/1900 | Jencke et al. | 248/692 |
| 1,048,192 | A * | 12/1912 | McMillan | B60N 3/102 211/106 |
| 1,050,112 | A * | 1/1913 | Douglas | A45F 5/00 248/692 |
| 1,055,488 | A * | 3/1913 | Paterson | 211/65 |
| 1,176,009 | A * | 3/1916 | Weimar | A47K 1/09 211/65 |
| 1,527,980 | A * | 3/1925 | Jones et al. | 248/113 |
| 1,892,687 | A * | 1/1933 | Teufel | A47G 25/0685 16/350 |
| 1,991,156 | A * | 2/1935 | Kahn | A47F 7/16 160/348 |
| 2,127,870 | A * | 8/1938 | Kennedy | A47G 25/24 223/88 |
| 2,205,489 | A * | 6/1940 | Nelson | A47G 25/26 223/95 |
| 2,278,650 | A * | 4/1942 | Drinkwater | 211/65 |
| 2,310,533 | A * | 2/1943 | Lindell | B44D 3/123 211/120 |
| 2,403,825 | A * | 7/1946 | Nissenbaum | B25H 3/003 206/379 |
| 2,429,041 | A * | 10/1947 | Anderson | A47G 25/0685 211/100 |

(Continued)

*Primary Examiner* — Ryan J Walters
*Assistant Examiner* — Lawrence Averick

(57) ABSTRACT

A system and method is provided whereby a mounting is configured for attachment to a paintbrush, wherein the paintbrush has a first end having bristles and a second end bristle free, a hanger having a first end is attached to said mounting cap and a second end having a hanging system for hanging said brush, and a support is configured for receiving said hanging system.

1 Claim, 16 Drawing Sheets

(56) References Cited

U.S. PATENT DOCUMENTS

| | | | | |
|---|---|---|---|---|
| 2,472,001 A * | 5/1949 | Buhoveckey | B44D 3/125 | |
| | | | 206/209 | |
| 2,644,589 A * | 7/1953 | Levine | A47G 25/54 | |
| | | | 206/285 | |
| 2,650,717 A * | 9/1953 | Larson | A47F 5/04 | |
| | | | 211/116 | |
| 2,723,826 A * | 11/1955 | Zanelli | 248/692 | |
| 2,744,635 A * | 5/1956 | Hiss | 211/65 | |
| 2,776,050 A * | 1/1957 | Switzer | 206/361 | |
| 2,952,364 A * | 9/1960 | Jacobson | 211/65 | |
| 3,156,364 A * | 11/1964 | Wolcott | 211/65 | |
| 3,194,457 A * | 7/1965 | Freilich | A47G 25/743 | |
| | | | 211/119 | |
| 3,197,169 A * | 7/1965 | Burrows | A47L 13/512 | |
| | | | 248/111 | |
| 3,432,875 A * | 3/1969 | Edelson et al. | 15/246 | |
| 3,465,893 A * | 9/1969 | Kinney | A47B 97/04 | |
| | | | 108/149 | |
| 3,468,508 A * | 9/1969 | Huver | A47B 81/005 | |
| | | | 211/64 | |
| 3,993,205 A * | 11/1976 | Pilchard | A47G 25/743 | |
| | | | 211/116 | |
| 4,121,798 A * | 10/1978 | Schumacher et al. | 248/113 | |
| 4,333,575 A * | 6/1982 | Wong | A47G 25/0685 | |
| | | | 211/100 | |
| 4,339,837 A * | 7/1982 | Reeberg | 15/246 | |
| 4,377,239 A * | 3/1983 | Jimae | 211/65 | |
| D271,546 S * | 11/1983 | Smith | D6/324 | |
| D276,195 S * | 11/1984 | Smith | D6/324 | |
| 4,607,752 A * | 8/1986 | Sherrow | B25B 11/00 | |
| | | | 211/65 | |
| 4,756,405 A * | 7/1988 | Crozier | B44D 3/123 | |
| | | | 206/1.7 | |
| 4,798,297 A * | 1/1989 | Weiss et al. | 211/65 | |
| 5,046,623 A * | 9/1991 | Takacs | 211/65 | |
| 5,072,904 A * | 12/1991 | Taylor | A46B 17/00 | |
| | | | 211/65 | |
| 5,097,967 A * | 3/1992 | Sica | 211/66 | |
| 5,174,445 A * | 12/1992 | Mull | 206/361 | |
| 5,472,101 A * | 12/1995 | Ahrens | A47B 81/00 | |
| | | | 211/182 | |
| 5,743,418 A * | 4/1998 | Ahrens | A47B 81/00 | |
| | | | 211/182 | |
| 5,829,603 A * | 11/1998 | Martineau | 211/66 | |
| 5,836,486 A * | 11/1998 | Ohsugi | A47G 25/32 | |
| | | | 211/113 | |
| 5,901,888 A * | 5/1999 | Schneider | A47G 25/403 | |
| | | | 223/88 | |
| 5,913,432 A * | 6/1999 | Ahrens | A47B 81/00 | |
| | | | 211/182 | |
| 6,056,253 A * | 5/2000 | Tripp | A46B 17/02 | |
| | | | 248/110 | |
| 6,193,080 B1 * | 2/2001 | Castillo | 211/66 | |
| 6,308,925 B1 * | 10/2001 | Wilcox | A47B 97/08 | |
| | | | 248/463 | |
| 6,827,212 B2 * | 12/2004 | Reaux | 206/372 | |
| 6,932,312 B1 * | 8/2005 | Chen | 248/316.1 | |
| 7,165,689 B2 * | 1/2007 | McDaniel | A47B 96/061 | |
| | | | 211/116 | |
| 7,234,602 B2 * | 6/2007 | Roberti | 211/65 | |
| 7,597,111 B2 * | 10/2009 | Bauer | B05B 13/0285 | |
| | | | 135/120.1 | |
| 8,100,272 B1 * | 1/2012 | Schaefer | 211/65 | |
| 8,118,339 B2 * | 2/2012 | Knudson | 294/162 | |
| 8,141,722 B2 * | 3/2012 | Heroux | A47G 25/1457 | |
| | | | 211/113 | |
| D658,015 S * | 4/2012 | Borovicka | D7/641 | |
| 8,162,156 B1 * | 4/2012 | Crisman | G10D 13/003 | |
| | | | 211/10 | |
| D690,168 S * | 9/2013 | Zemel | D7/637 | |
| 8,540,087 B1 * | 9/2013 | Skaer | A47G 25/0685 | |
| | | | 211/100 | |
| 8,701,899 B2 * | 4/2014 | Paga | A47F 5/01 | |
| | | | 211/181.1 | |
| D723,905 S * | 3/2015 | Fugett | D8/380 | |
| D725,423 S * | 3/2015 | Fugett | D6/702 | |
| 2003/0127348 A1 * | 7/2003 | Usui | 206/362 | |
| 2003/0168356 A1 * | 9/2003 | Usui | 206/1.7 | |
| 2005/0269469 A1 * | 12/2005 | Cummins | B44D 3/123 | |
| | | | 248/303 | |
| 2010/0108834 A1 * | 5/2010 | Rigas | A47G 25/0685 | |
| | | | 248/213.1 | |
| 2010/0282283 A1 * | 11/2010 | Bauer | B05B 13/0285 | |
| | | | 135/96 | |
| 2010/0294817 A1 * | 11/2010 | Knudson | 224/148.6 | |
| 2013/0119003 A1 * | 5/2013 | Paga et al. | 211/65 | |
| 2014/0325779 A1 * | 11/2014 | Dansby | 15/168 | |
| 2014/0332642 A1 * | 11/2014 | Lim | A46B 17/04 | |
| | | | 248/111 | |
| 2015/0360505 A1 * | 12/2015 | Beck | B44D 3/123 | |
| | | | 211/65 | |

* cited by examiner

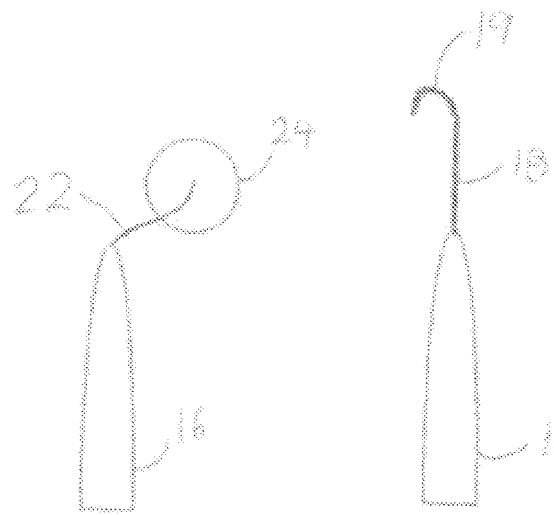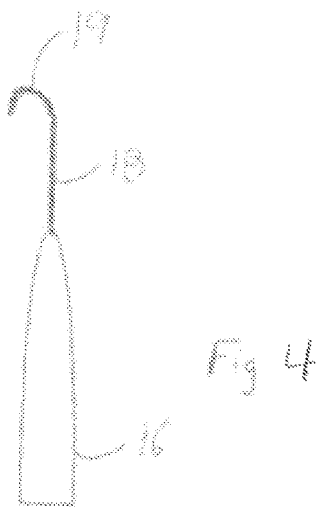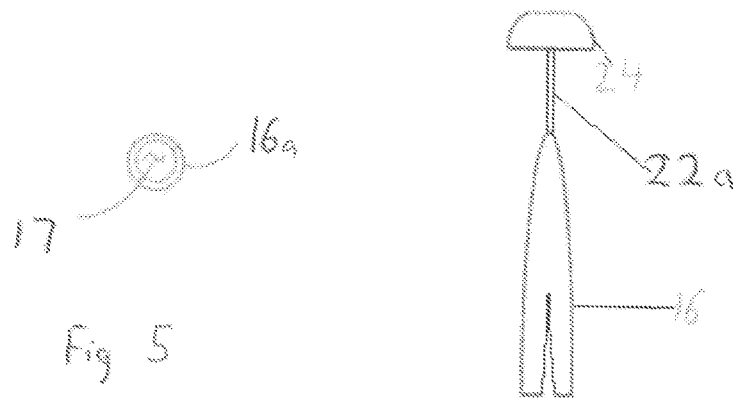

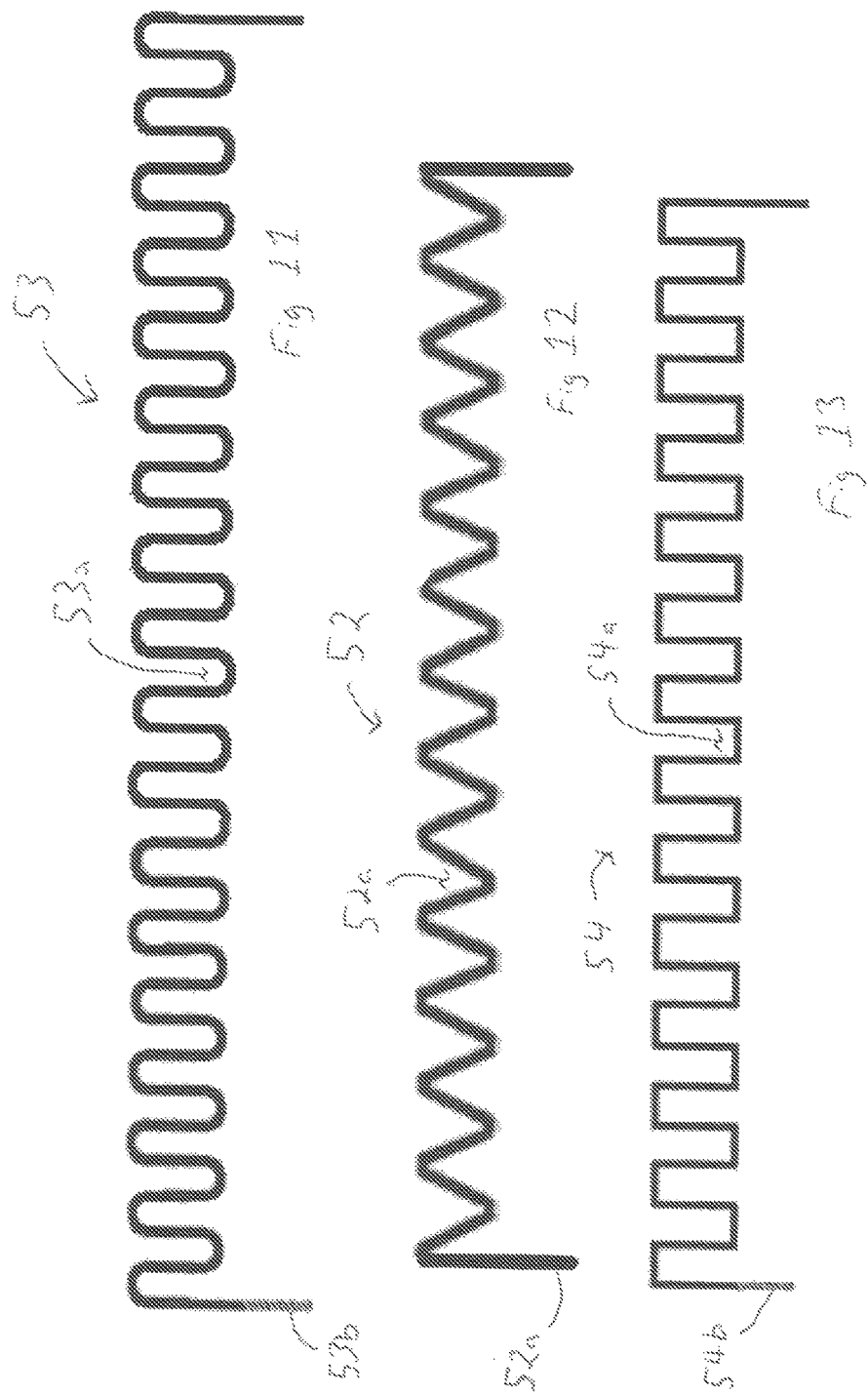

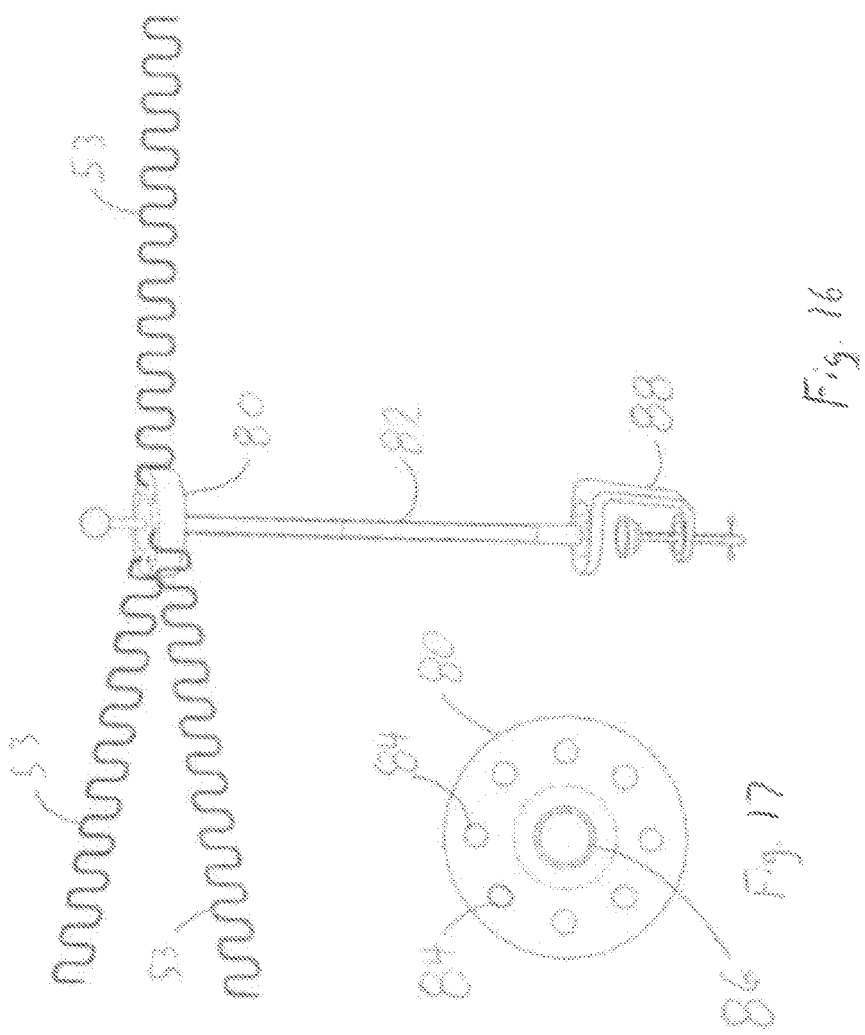

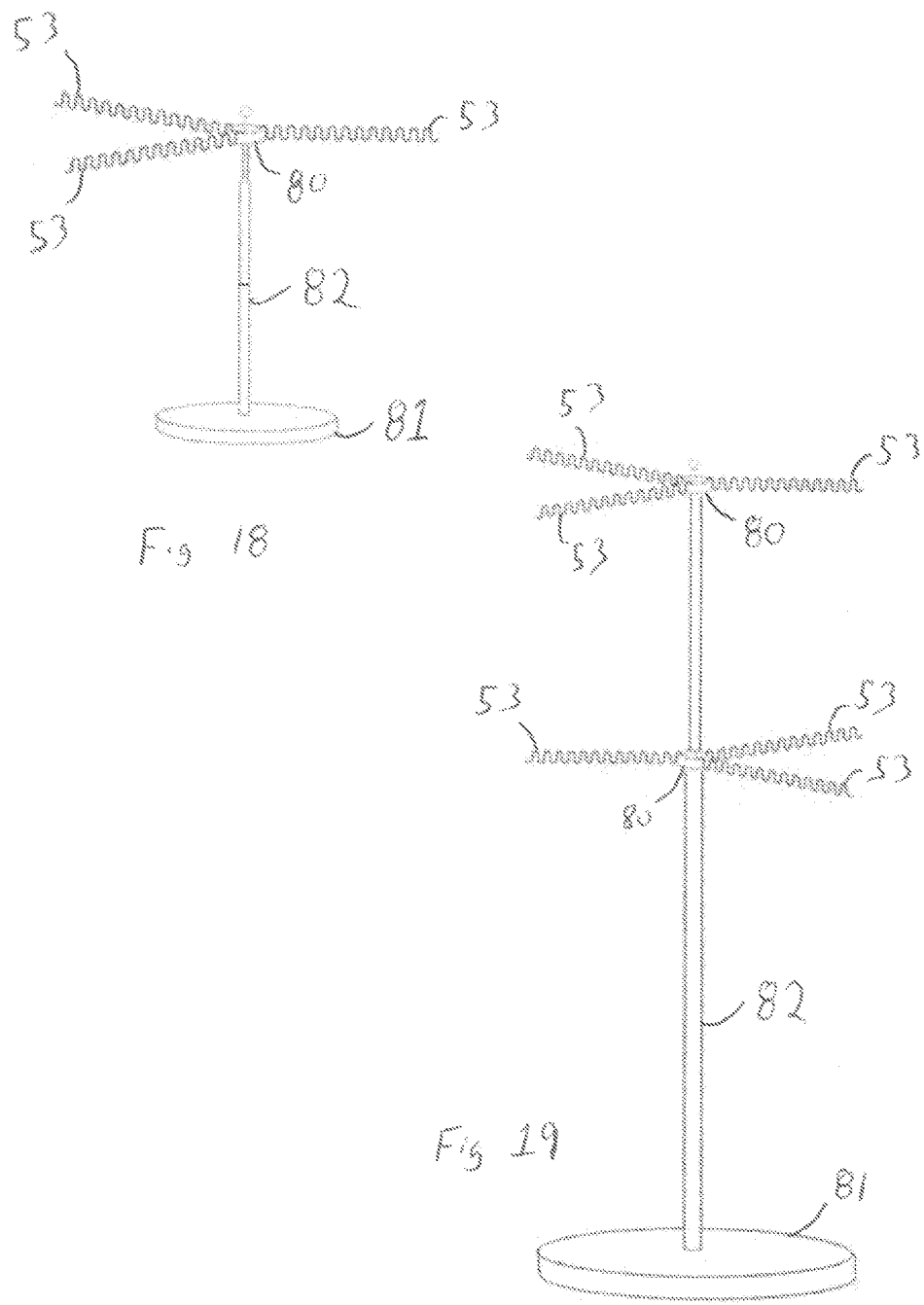

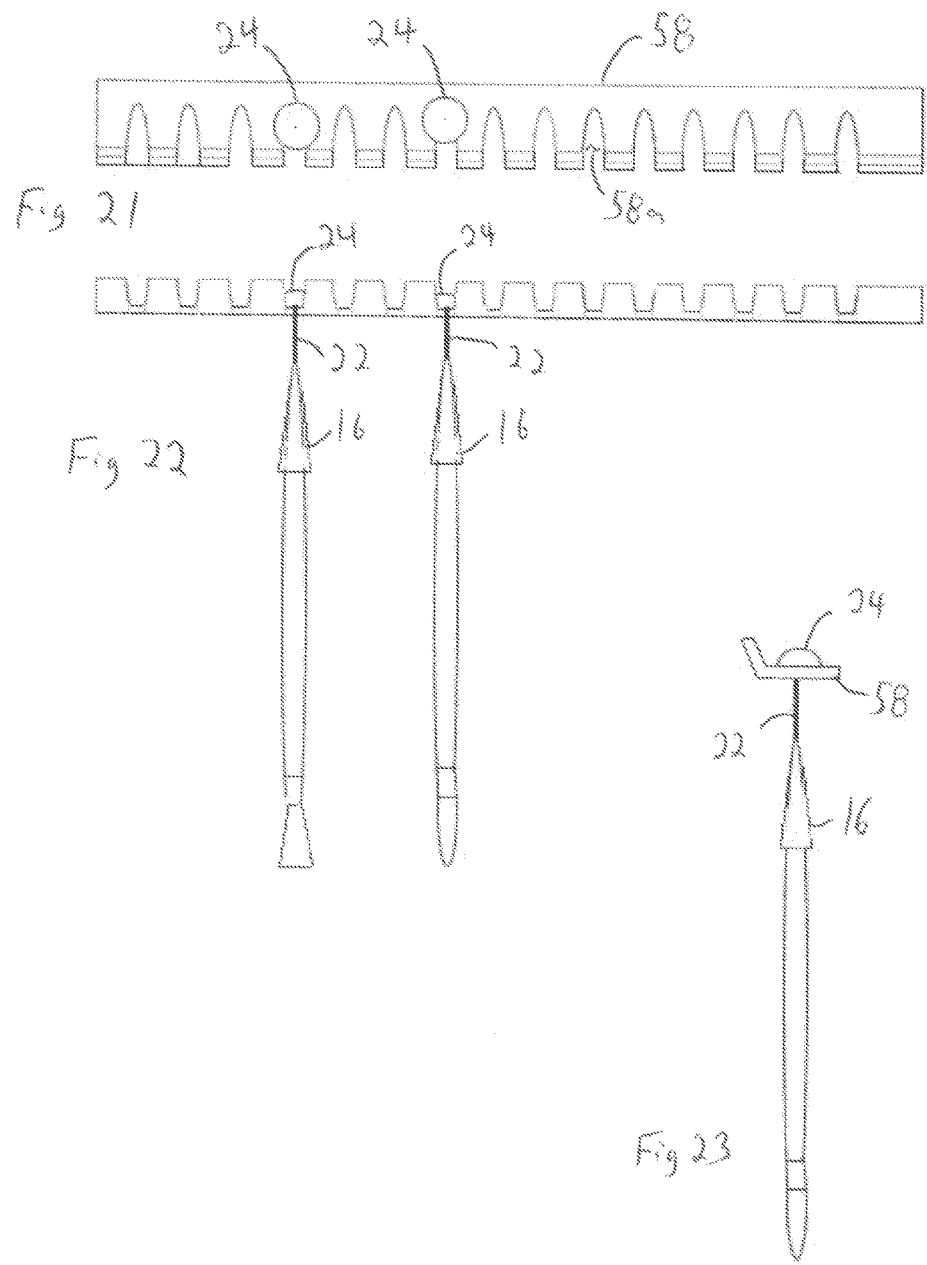

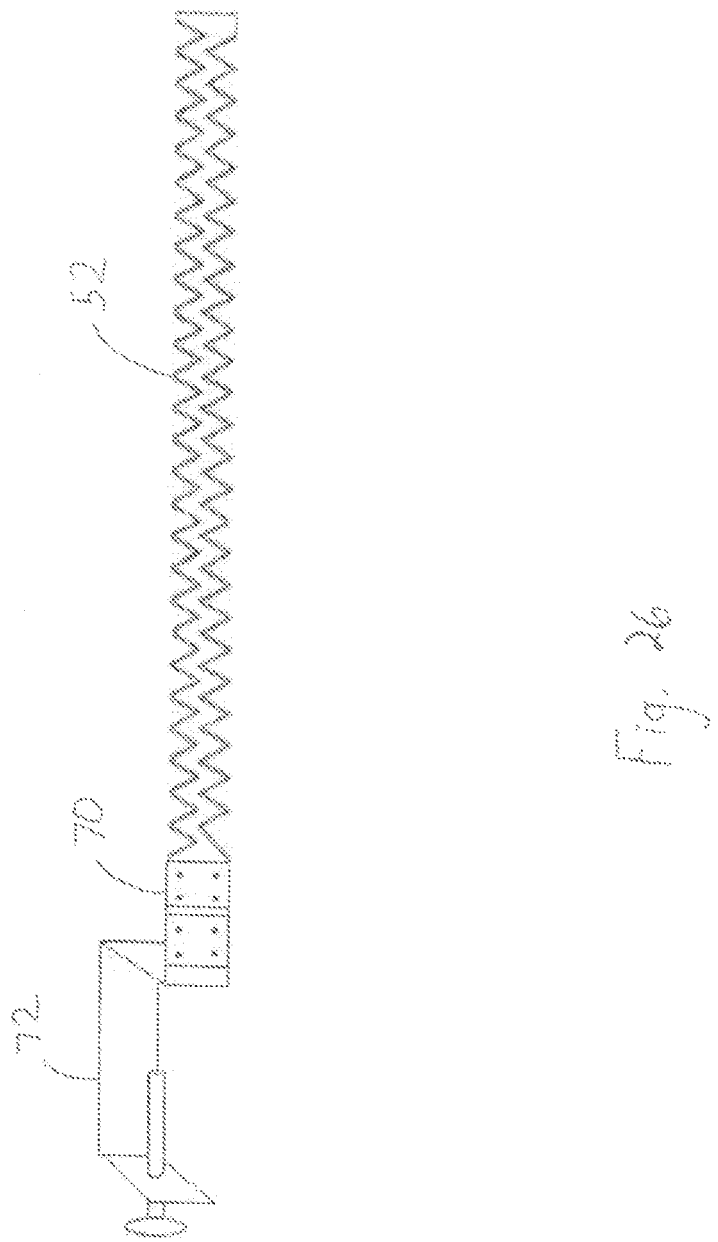

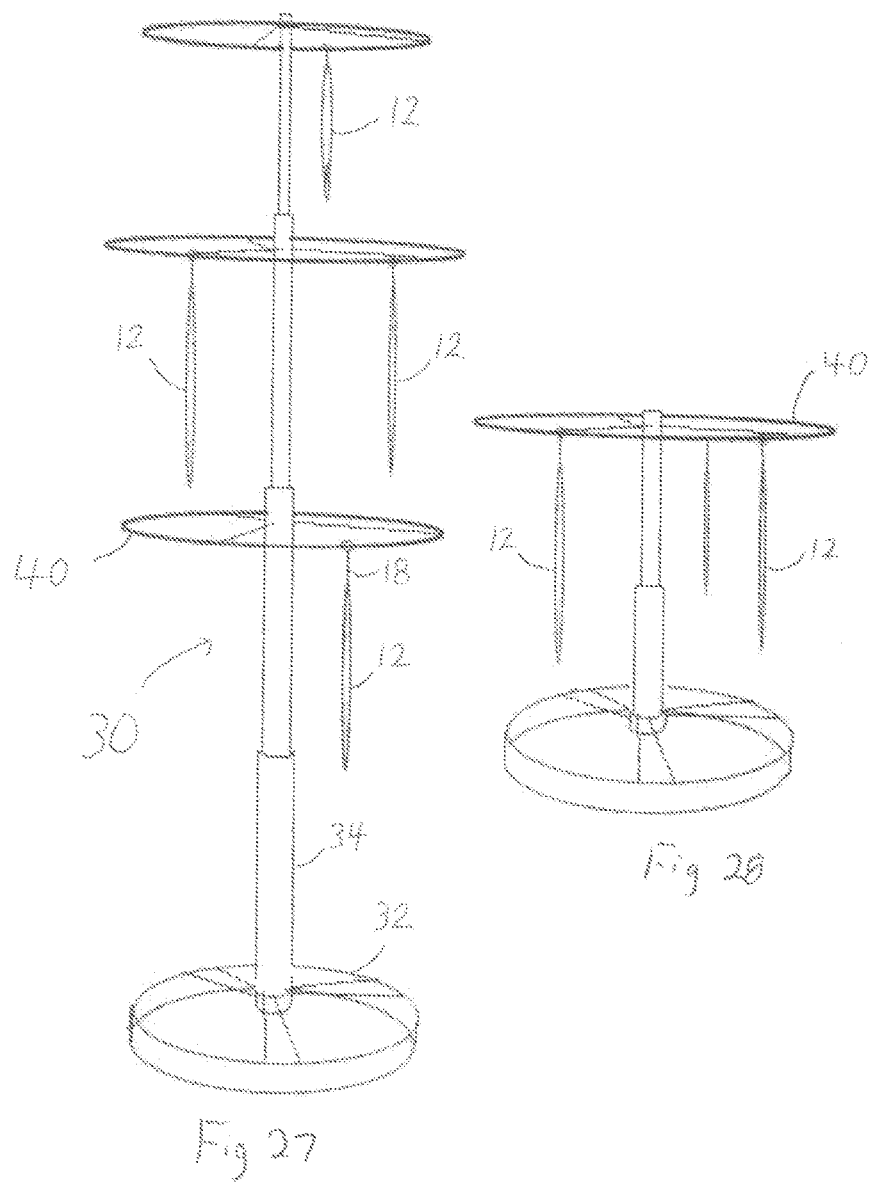

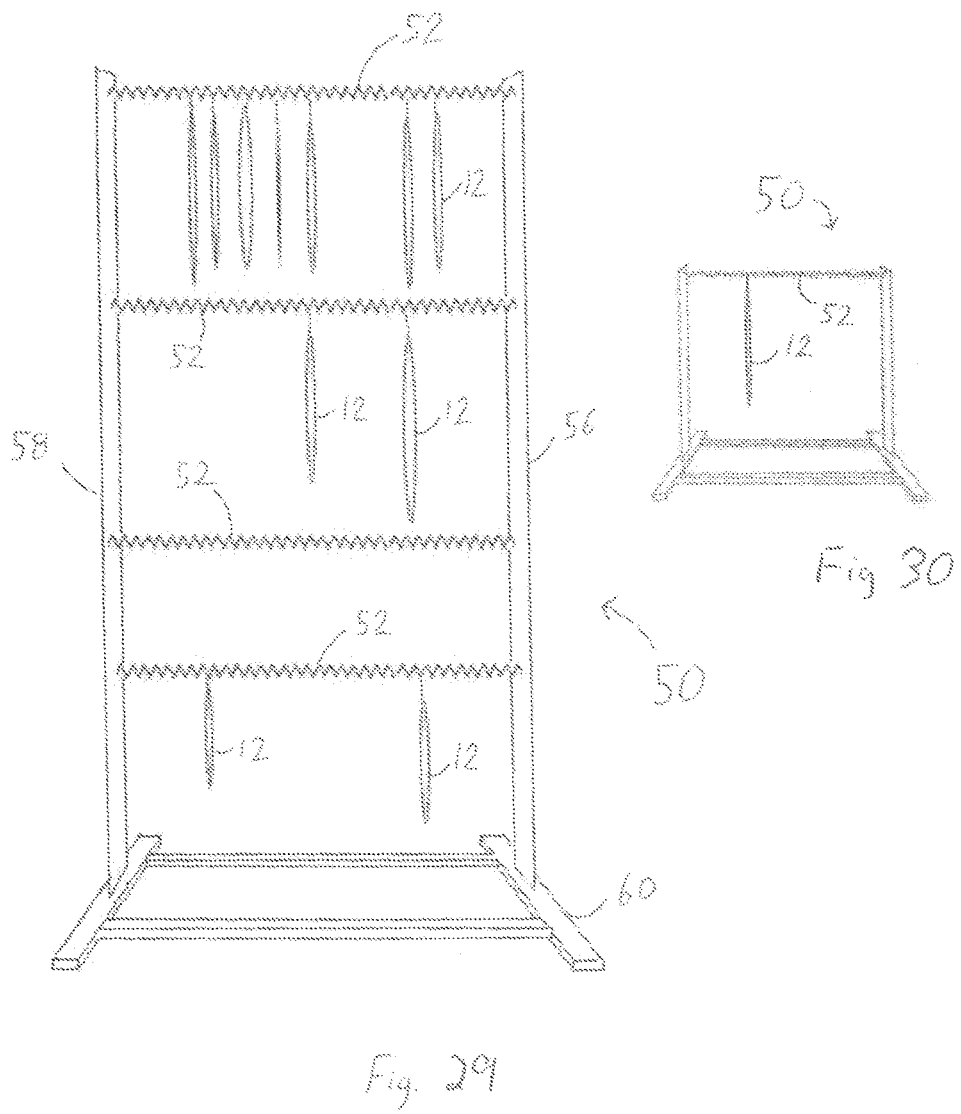

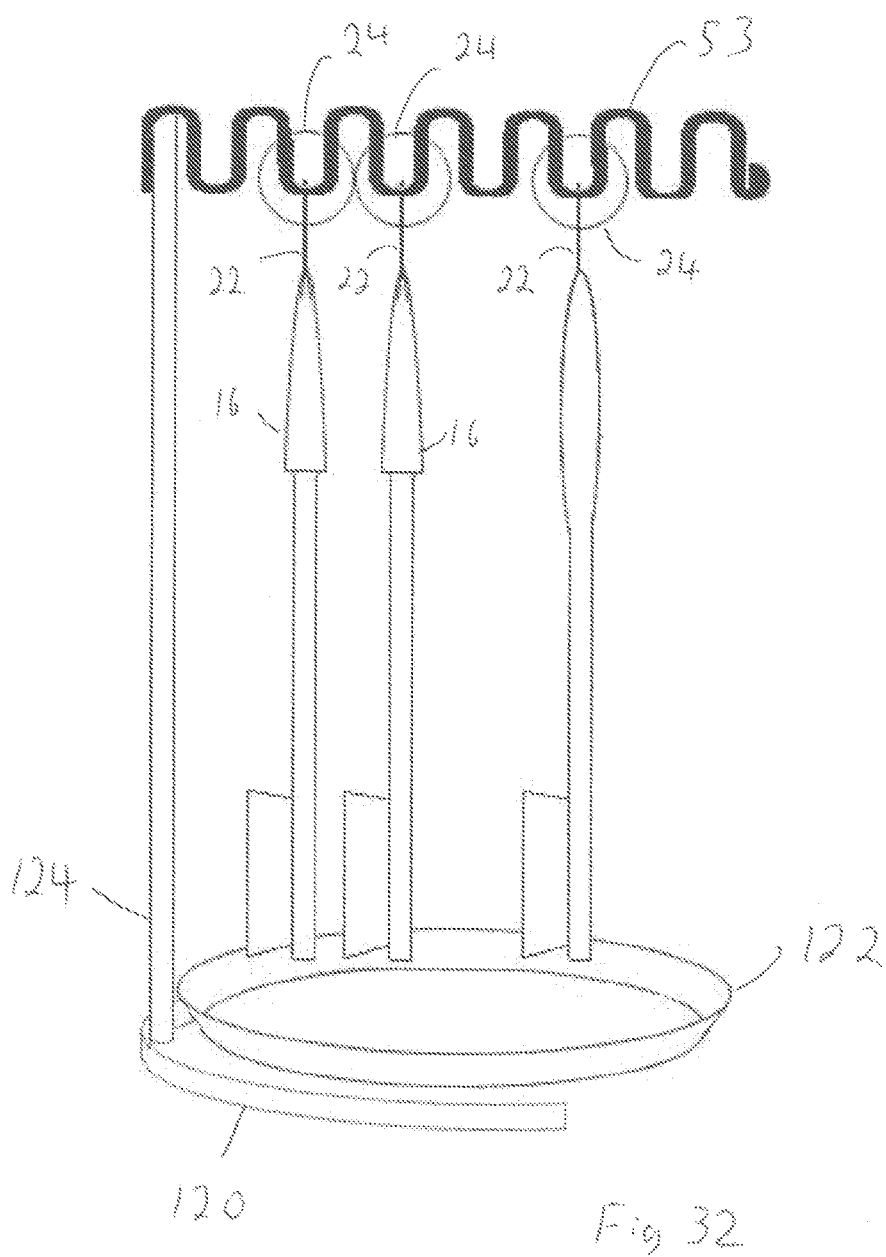

SYSTEM FOR HANGING ARTISTS BRUSHES AND SIMILAR CYLINDRICAL IMPLEMENTS

INDEX TO RELATED APPLICATIONS

This application is a non-provisional of, and claims benefit to U.S. Provisional Patent Application Ser. No. 61/743,707 filed Sep. 10, 2012 the disclosure of which is incorporated herein by reference in its entirety.

BACKGROUND OF THE INVENTION

Artists are known for using a significant number of implements in the performance of their craft. One feature universal to painters is a plurality of paintbrushes. However, there is a difficulty in the fact that painters do not have an efficient and accessible way of storing brushes such that they can be easily selected, accessed and hung back in the most desirable, bristles down position during painting or storing. The present invention addresses this by providing a hanging system whereby brushes are clearly displayed on the eye level of the user, for quick selection, in an easily accessible manner such that an artist can readily change brushes during painting and hang them back in the desired position where the paint or painting medium will be prevented from flowing toward the ferule, and the shape of the bristles will be preserved by gravitational pull.

SUMMARY OF THE INVENTION

In one embodiment, the present invention is a system for handing implements, artists' paintbrushes, tools and the like comprising:
a mounting, being one of a cap, flexible tab, or ring configured for attachment to a paintbrush, wherein the paintbrush has a first end having bristles and a second end bristle free; a hanger having a first end attached to said mounting cap and a second end having a hanger device for hanging said brush; and a support configured for receiving said hanging system.

The mounting is attached by at least one of adhesive, tension, snap-fit attachment, or combinations thereof. Tension is generally known to refer to the mounting cap having a receiving cavity configured such that when the second end of the paintbrush handle is inserted therein, a tight fit secures the cap on the brush.

In one embodiment, the hanger is formed of flexible material including, but not limited to wire, thread, cord, plastic and the like.

In another embodiment, the hanger member is rigid and not flexible.

In one embodiment, the hanger device is an incorporated enlarged end, hook, attachment cap, or mounting cup and the hanging support system is at least one of a rod, a hanging bracket, a bar with a plurality openings, preferably narrow openings, and members configured for engaging a hanger device, or combinations thereof.

In a configuration using a hanging bracket being a bar with a plurality of openings and members configured for engaging a hanger device, the bar includes at least one hanging opening for receiving said hanging system.

Also contemplated is a method for hanging artists' paintbrushes comprising:
providing a system described herein;
attaching said mounting onto at least one paintbrush;
engaging said hanger device with said support system.

BRIEF DESCRIPTION OF THE SEVERAL VIEWS OF THE DRAWING

FIG. 3 is one embodiment of the present invention whereby a paintbrush attaching cap has connected thereto an attaching plate.

FIG. 4 is one embodiment of the present invention whereby a paintbrush attaching cap has connected thereto a hanger configured with a terminal hook.

FIG. 5 is a bottom view showing the insertion cavity of an attaching cap according to the present invention.

FIG. 6 is a side perspective view of a hanger according to one embodiment of the present invention with a rigid hanger connected to a hanger plate.

FIG. 11 is a plan view of a U-shaped hanger support bracket according to the present invention.

FIG. 12 is a plan view of a V-shaped hanger support bracket to the present invention.

FIG. 13 is a plan view of a square configured hanger support bracket according to the present invention.

FIG. 16 is a perspective view of one embodiment of the present invention whereby a plurality of hangers are dependent upon a holder mounted on a rod system.

FIG. 17 is a top view of the holder from FIG. 16.

FIG. 18 is a perspective view of one embodiment of the present invention whereby a plurality of hangers are dependent upon a holder mounted on a rod system.

FIG. 19 is a perspective view of one embodiment of the present invention whereby a plurality of hangers are dependent upon a holder mounted on a rod system utilizing more than one holder.

FIG. 21 is a top view of a hanger support plate according to the system of the present invention.

FIG. 22 is a side view of brushes hanging on a hanger support plate according to the present invention.

FIG. 23 is a side view of a single brush hanging on a hanger support plate according to the present invention.

FIG. 26 is demonstrative of one embodiment of the present invention whereby a hanger is affixed to a hinge dependent on a clamp cut or molded of aluminum or plastic.

FIG. 27 is a side perspective view of a multilevel hanger according to one embodiment of the system of the present invention.

FIG. 28 is a side perspective view of a single level hanger according to one embodiment of the present invention.

FIG. 29 is a side perspective view of a multilevel hanger according to one embodiment of the system of the present invention.

FIG. 30 is a side perspective view of a single level hanger according to one embodiment of the present invention.

FIG. 31 is a side view of one embodiment of the system of the present invention.

DETAILED DESCRIPTION OF THE PREFERRED EMBODIMENT

Figure 1:
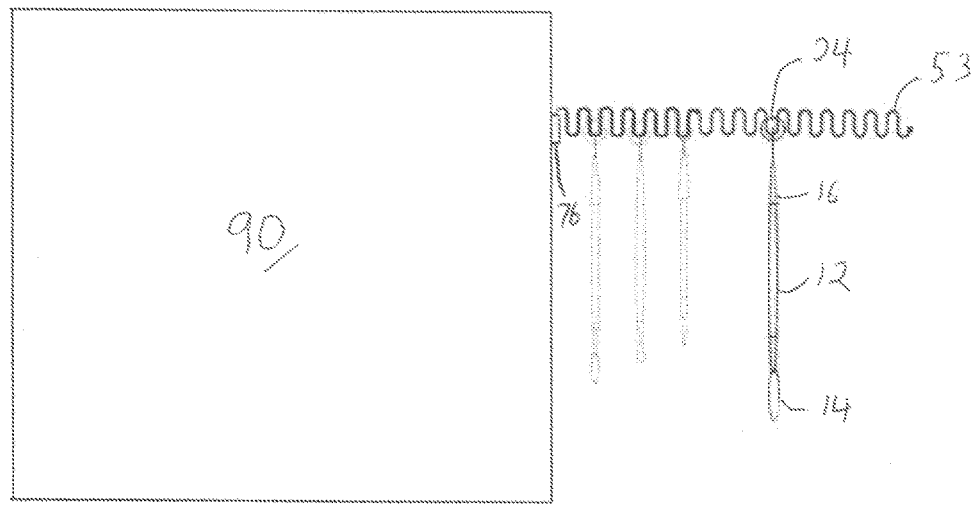
FIG. 1 is a front view of one embodiment of the system of the present invention.

The present invention relates generally to a system for hanging individualized articles. Although the several figures demonstrate an embodiment utilizing artists' brushes, the invention is contemplated as being suitable for pens, pencils, hand tools and other genres in which individualized implements are selected from a plurality of implements including, but not limited to calligraphy pens, cosmetic pens/brushes/applicators, nail manicure implements, pencils, dental technician brushes and like tools.

In one embodiment, system 10 includes an artist's paintbrush handle 12 having a first end including bristles 14 and a second end onto which mounting 16 is affixed. It is generally understood that according to the present invention mounting 16 is affixed to paint brush 12 by any acceptable means including a suitable adhesive, attachment ring, or as a mounting cap 16a with a tension/snap fit attachment. In the embodiment where mounting 16 is a cap, mounting cap 16a has formed therein mounting cavity 17 constructed and arranged to receive the second end of paintbrush 12. In one embodiment, hanger 18 extends outward from mounting cap 16 and has formed on its end hanger hook 19. In another embodiment, mounting cap 16a and cap hanger 22 connect to attachment plate 24. As generally understood, the plate is any shape as long as it is slightly bigger than the opening in which it is engaged.

Mounting in one embodiment is configured as a flexible holder 16b having adhesive 16c disposed thereon for attaching to handle 12. Mounting is also configured in one embodiment as mounting ring 16d and optionally hanger extender 22b dependent thereon. Additionally, one embodiment provides hanger 22a has a rigid hanger.

In the embodiment in which hanger hook 19 is utilized, a brush 12 is hung on any surface able to engage hanger hook 19 such as the hanging rod 20 as shown in FIG. 31, the rings stand hanging systems shown in FIGS. 18, 19, 27, and 28, the rack stand systems shown in FIGS. 29, 30, and any embodiment incorporating "V" hanging bracket 52, "U" hanging bracket 53 or square hanging bracket 54 as in FIGS. 11-13.

In an embodiment incorporating attachment plate 24, a brush according to the present invention is hung on any system incorporating "V" hanging bracket 52, "U" hanging bracket 53, square bracket 54 such as the rack stand systems shown in FIGS. 29-30 or mounted hanging brackets as demonstrated in FIGS. 16-19, and 27-28.

Hanging brackets are provided in FIGS. 11-13. In one embodiment, the system of the present invention incorporates "V" hanging bracket 52 in which a "v" hanging opening 52a is formed by the shape of "V" hanging bracket 52. The systems incorporating "V" hanging bracket 52 are suitable for using hanger hook 19, attachment plate 24, or combinations thereof.

In one embodiment, the hanging bracket is configured as "U" hanging bracket 53, in which a "u" hanging opening 53a is formed by the shape of "u" hanging bracket 53 and can accommodate hanger hook 19, attachment plate 24, or combinations thereof.

In one embodiment, the hanging bracket is configured as squared hanging bracket 54, in which a squared hanging opening 54a is formed by the shape of "u" hanging bracket 54 and can accommodate hanger hook 19, attachment plate 24, or combinations thereof.

Systems of the present invention are utilized in numerous embodiments. In one embodiment, as demonstrated in FIGS. 27-28, a ring stand 30 having at least one mounting ring 40 is supported on a base 32 and vertical support 34. Brush 12 is hung on mounting ring 40.

In one embodiment, as demonstrated in FIGS. 29 and 30 a hanger stand 50 has at least one hanger bracket. Although the figures demonstrate hanger bracket 52 used in hanger stand 50, any configured hanger bracket according to the present invention is contemplated.

In one embodiment, the system of the present invention, as demonstrated in FIGS. 11-13 includes at least one of hanger bracket 52, 53, or 54 as described above. Wherever the term "hanger bracket" is used herein, it refers interchangeably to any of the configurations 52, 53, or 54. In this embodiment, the hanger is cut or molded of flat aluminum, plastic, or other material. In one embodiment, each of 52, 53, and 54 is a bended or formed metal wire.

In one embodiment, a hanger selected from at least one of 52, 53, or 54 (and 58 and one from FIG. 26) is dependent upon a hinge 70 connected to a mounting assembly 72. Bracket plate 58 can also be cut or molded of metal or plastic or wood.

In this embodiment, mounting assembly 72 is mounted directly onto a canvas stretcher, easel or other article and hinge 70 allows for rotational movement of hanger bracket 52 in order that hanger bracket 52 be positioned as desired. This configuration is further embodied in a configuration as demonstrated in FIGS. 1 and 2 whereby hanger bracket 52 is affixed to the canvas-stretching frame 92 of canvas 90.

In one embodiment, bracket 52 is directly mounted on a mounting assembly 72. In one embodiment, the mounting assembly is formed of a single unitary piece and is not required to have any type of attachment to a mounting bracket.

Figure 2:
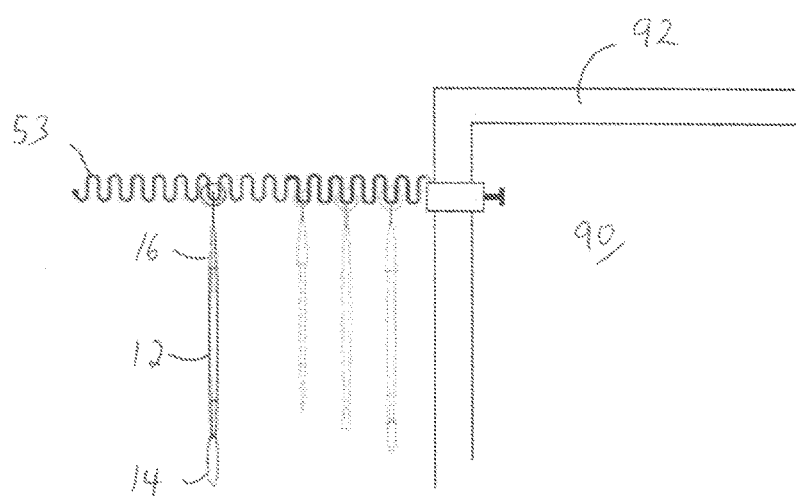
FIG. 2 is a partial rear view of one embodiment of the system of the present invention.
Figure 7:
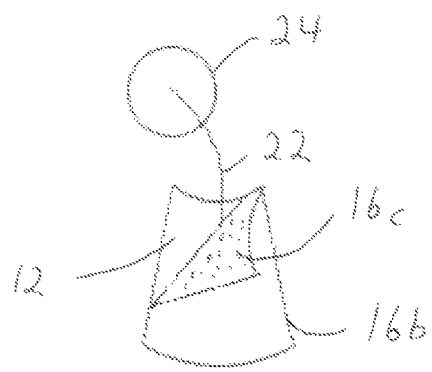
FIG. 7. is a side perspective view of a hanger according to one embodiment of the present invention with adhesive for mounting.
Figure 8:
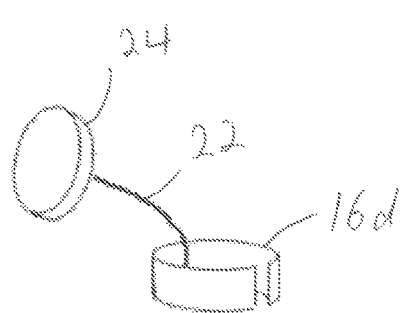
FIG. 8 is a close-up side view of one embodiment of the mounting provided as mounting ring.
Figure 9:
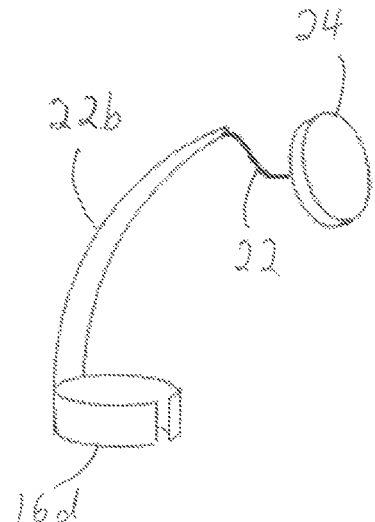
FIG. 9 is a close-up side view of one embodiment of the mounting provided as mounting ring with a hanger extension.
Figure 10:
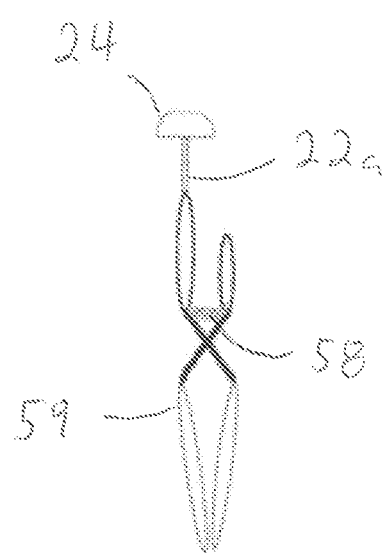
FIG. 10 is a side view demonstrating hanging of a tool according to the present invention whereby a clip holds the brush handle.
Figure 14:
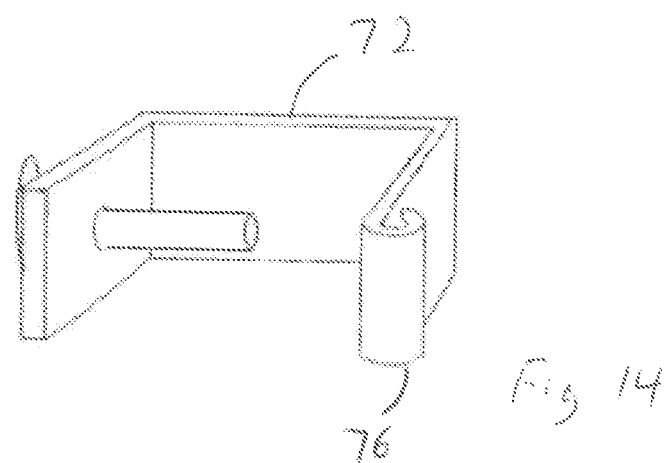
FIG. 14 is a perspective view of a mounting bracket configured to mount a bracket of the present invention on a painter's canvas support frame.
Figure 15:
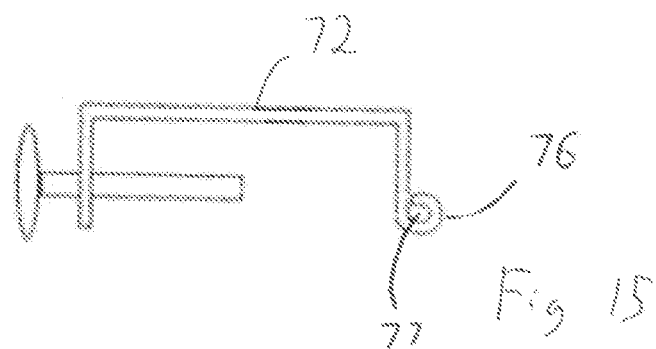
FIG. 15 is a top view of a mounting bracket configured to mount a bracket of the present invention on a painter's canvas support frame.

In one embodiment, as demonstrated in FIG. 1 and FIGS. 14 and 15, bracket 72 has formed there on bracket hanger mount 76 that encloses a bracket hanger support orifice 77. In this embodiment, a bracket hanger mounting support corresponding to any one of the structures 52b, 53b, or 54b is inserted into hanger support orifice 77. In this embodiment, bracket hanger support is configured to rotate as desired about and axis formed by bracket hanger mounting support contained within hanger support orifice 77 by hanger support 76.

In another embodiment, as demonstrated in FIGS. 18 and 19, a central holder 80 is configured to hold any one of a plurality of hanging brackets 52, 53, and 54 whereby each hanging bracket 53 is received by a receiving orifice 84 formed within central holder 80 allowing rotation. Central holder 80 is mounted upon a support rod 82 dependent upon a base. In one embodiment, rod 82 is telescopically extendable and retractable. In another embodiment, any configuration imparting extension is used.

In the embodiment demonstrated in FIGS. 18-19 the base is a support base 81. However, support rod 82 can be constructed and arranged to support into any base including a stationary base resting upon a surface.

Figure 20:
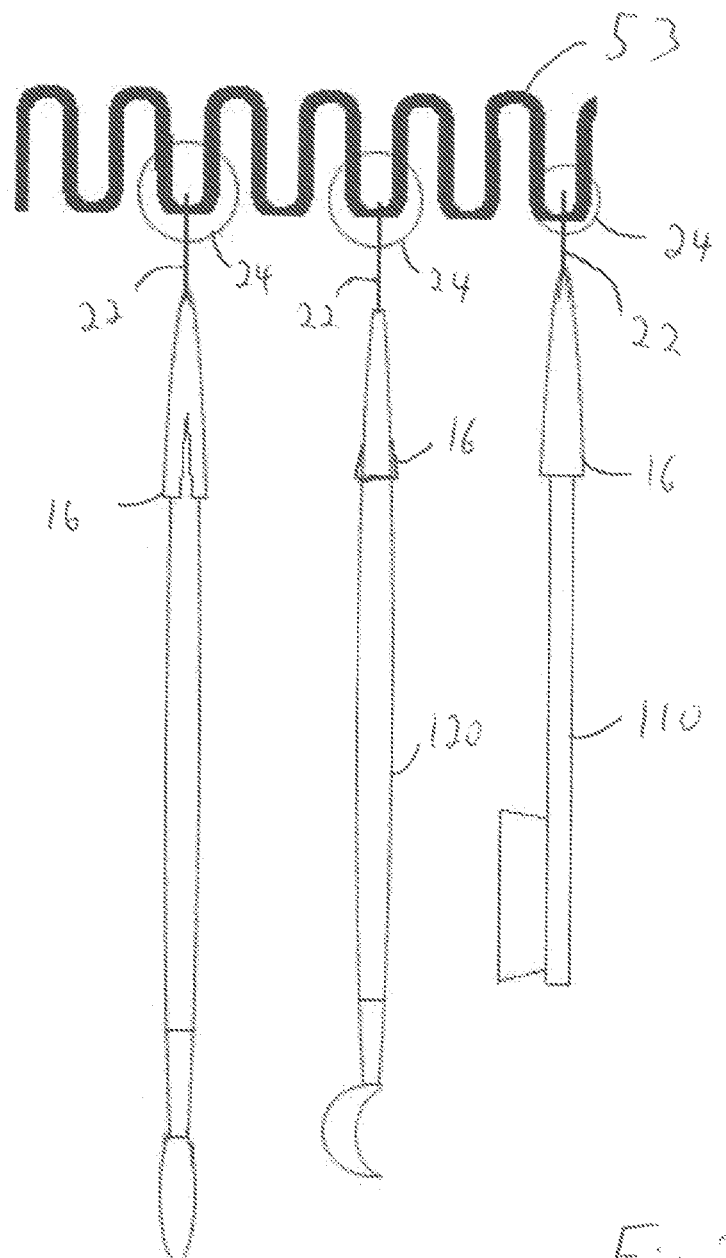
FIG. 20 is a side view demonstrating the present invention for hanging a paintbrush, a dental tool, and a toothbrush utilizing the system of the present invention.
Figure 24:
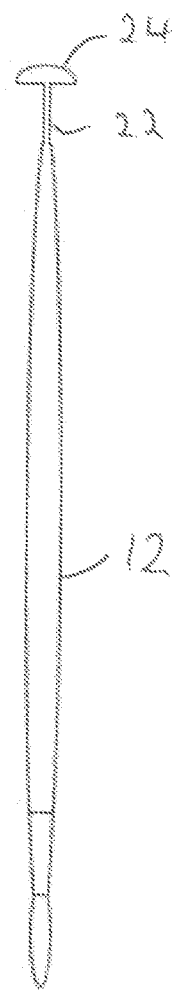
FIG. 24 is a side view of one embodiment of the present invention whereby the hanger and hanger plate are incorporated onto a brush handle.
Figure 25:
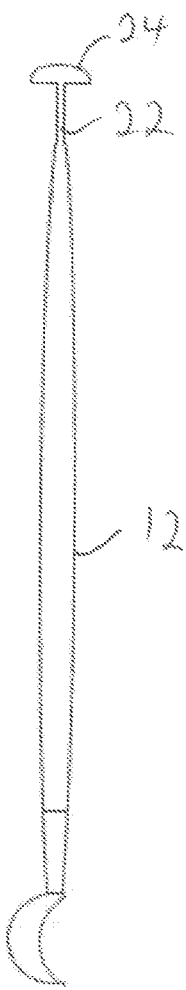
FIG. 25 is a side view of one embodiment of the present invention whereby the hanger and hanger plate are incorporated onto the handle of a small tool.

As demonstrated in FIG. 20, the present invention is contemplated used with a variety of cylindrically elongated implements including but not limited to dental tool 120 and toothbrush 110.

In one embodiment, as demonstrated in FIGS. 21, 22, and 23, hanging bracket is configured as bracket plate 58 having a plurality of openings 58a incorporated thereon, whereby openings 58a are constructed and arranged to receive hanger plate 24 according to the present invention.

Figure 32:
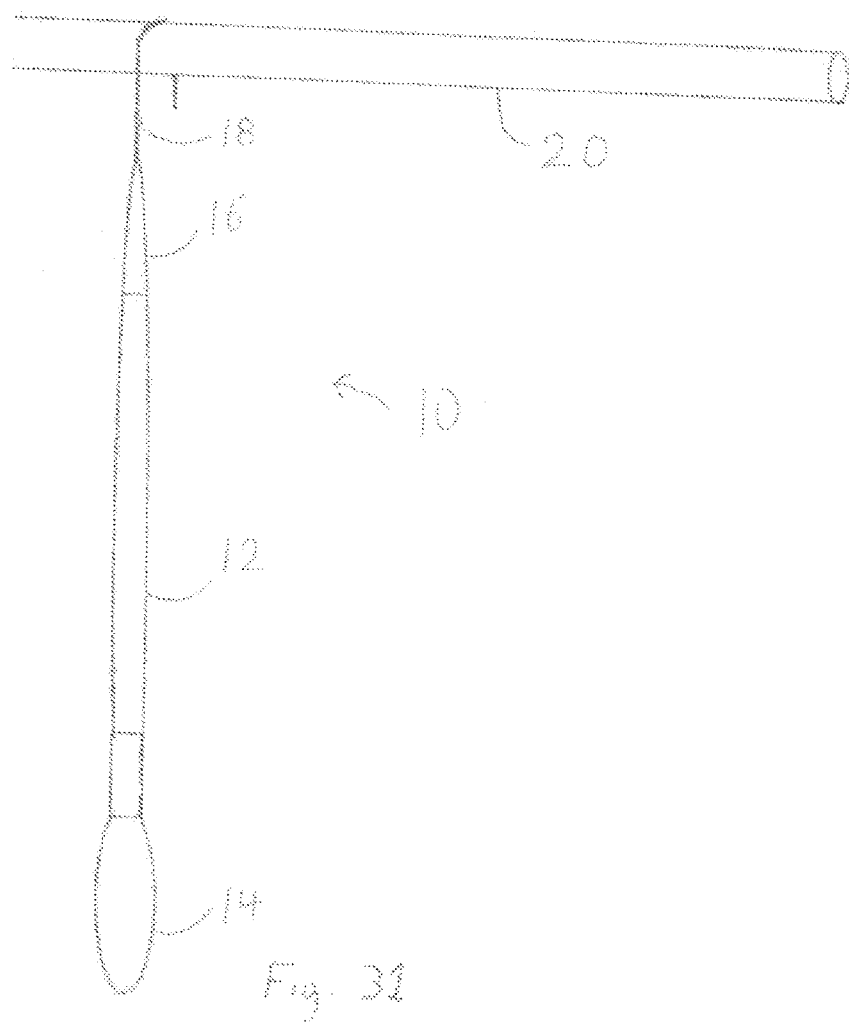
FIG. 32 is a perspective view of the present invention whereby brushes are positioned over a drip pan.

In one embodiment, as demonstrated in FIG. 32, base support 120 holds vertical support 124 wherein hanger bracket 53 is attached thereto. In this embodiment, drip plate 122 is positioned below the toothbrushes utilized in the present invention in order that excess paint (fluid) drips into drip plate 122.

The system of the present invention further encompasses a method whereby a user is supplied with a properly sized mounting cap 16 based on the geometric configuration of paintbrush body 12. The user will affix mounting cap 16 onto the second end of paintbrush body 12. The user will affix mounting cap 16 onto the second and of paintbrush body 12. As demonstrated by the various figures, and generally understood, the second end is the end opposite the paintbrush bristles 14. Based upon the desired and available hanger the user will select cap 16 configured with either hanger configuration 19 or attachment plate 24. The user will use the paintbrush 12 as desired and when desiring to change brushes will utilize a hanging configuration according to the present invention.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

I claim:

1. A system for holding a plurality of artist paintbrushes comprising:
    a mounting assembly configured to clamp to a canvas, canvas support frame, canvas stretcher or easel,
    the mounting assembly comprising at least three rigid surfaces and an adjustable tightening mechanism,
    an elongated hanger bracket comprising a plurality of U or V shaped segments connected to one another,
    a plurality of attachment plates each having a hemispherical shape and each attached to one of the plurality of U or V shaped segments,
    a plurality of mounting caps each connected to respective attachment plates of the plurality of attachment plates, and
    each attachment plate comprising a cap hanger which is flexible and is attached to the respective attachment plate and respective mounting cap,
    each mounting cap comprising a mounting cavity configured to receive an end of a paint brush and hold the paint brush upside down by tension.

* * * * *